(12) United States Patent
Filippi

(10) Patent No.: US 7,465,324 B2
(45) Date of Patent: Dec. 16, 2008

(54) PROCESS FOR OBTAINING A HEATING FLUID AS INDIRECT HEAT SOURCE FOR CARRYING OUT REFORMING REACTIONS

(75) Inventor: Ermanno Filippi, Castagnola (CH)

(73) Assignee: Ammonia Casale S.A., Lugano-Besso (CH)

( * ) Notice: Subject to any disclaimer, the term of this patent is extended or adjusted under 35 U.S.C. 154(b) by 819 days.

(21) Appl. No.: 09/802,925

(22) Filed: Mar. 12, 2001

(65) Prior Publication Data

US 2001/0025449 A1 Oct. 4, 2001

(30) Foreign Application Priority Data

Mar. 22, 2000 (EP) .................. 00106237

(51) Int. Cl.
*C01B 3/32* (2006.01)
*C10J 3/46* (2006.01)

(52) U.S. Cl. .................. 48/127.5; 48/197 R; 423/418.2
(58) Field of Classification Search ............. 423/418.2; 422/148, 146, 207, 220, 231; 48/197 R, 48/127.7, 127.5
See application file for complete search history.

(56) References Cited

U.S. PATENT DOCUMENTS

| | | | | |
|---|---|---|---|---|
| 3,717,129 A | * | 2/1973 | Fox | ............ 123/1 A |
| 4,003,343 A | * | 1/1977 | Lee | ................ 123/3 |
| 4,156,659 A | * | 5/1979 | Barnhart | ............ 376/323 |
| 4,337,170 A | * | 6/1982 | Fuderer | ............ 252/373 |
| 4,479,925 A | * | 10/1984 | Shires et al. | ........... 423/359 |
| 4,488,866 A | * | 12/1984 | Schirmer et al. | ........... 431/4 |
| 4,681,701 A | | 7/1987 | Sie | |
| 5,011,625 A | * | 4/1991 | Le Blanc | ............ 252/376 |
| 5,122,299 A | * | 6/1992 | Le Blanc | ............ 252/376 |
| 6,099,922 A | * | 8/2000 | Boll et al. | .......... 428/34.4 |
| 6,170,264 B1 | * | 1/2001 | Viteri et al. | ............ 60/671 |
| 6,871,502 B2 | * | 3/2005 | Marin et al. | ............ 60/772 |
| 2001/0033819 A1 | * | 10/2001 | Zhdanok et al. | ........ 423/418.2 |

FOREIGN PATENT DOCUMENTS

| | | |
|---|---|---|
| DE | 43 40 688 A1 | 6/1995 |
| DE | 43 27 176 C1 | 1/1998 |
| EP | 0 212 755 A2 | 3/1987 |
| EP | 0 212 755 A3 | 3/1987 |
| EP | 0 450 872 A | 10/1991 |
| JP | 62-53396 | 3/1987 |
| WO | WO 00/10912 * | 3/2000 |

\* cited by examiner

*Primary Examiner*—N. Bhat
(74) *Attorney, Agent, or Firm*—Sughrue Mion, PLLC

(57) ABSTRACT

A process for obtaining a heating fluid as indirect heat source for carrying out endothermic reactions, includes the steps of feeding a flow comprising hydrocarbons and a gas flow comprising oxygen to a combustor wherein such flows are suitably compressed. The hydrocarbons are burned in the presence of the oxygen in the combustor thus obtaining the high temperature fluid comprising carbon dioxide and oxygen.

8 Claims, 2 Drawing Sheets

PROCESS FOR OBTAINING A HEATING FLUID AS INDIRECT HEAT SOURCE FOR CARRYING OUT REFORMING REACTIONS

FIELD OF APPLICATION

The present invention relates to a process for obtaining a heating fluid as indirect heat source for carrying out endothermic reactions, such as hydrocarbon reforming reactions.

More specifically, the present invention relates to a process comprising the steps of:
  feeding a flow comprising hydrocarbons and a gas flow comprising oxygen to a combustor, wherein such flows are suitably compressed;
  burning the hydrocarbons in presence of the oxygen in the combustor, thus obtaining a high temperature fluid comprising carbon dioxide and oxygen.

The present invention also relates to a process for carrying out hydrocarbon reforming reactions in an exchanger type reformer.

In the following of the description and in the appended claims, by the term: "hydrocarbons", it is generally intended to mean light gaseous hydrocarbons (C1-C4) such as methane, natural gas, refinery gas, or light liquid hydrocarbons, such as naphtha, and their mixtures. Moreover, by the term: "gas flow comprising oxygen". It is generally intended to mean air, air enriched with oxygen or pure oxygen.

In the following of the description and in the appended claims, by the term: "reforming of hydrocarbons", it is intended to mean the endothermic transformation of hydrocarbons, in presence of water vapour. In such a way, compounds are obtained, such as hydrogen, carbon monoxide, and carbon dioxide that act as basic reactants in a plurality of chemical reactions.

The term: "exchanger type reformer" relates to a particular apparatus suited to carry out reforming of hydrocarbons. From a conceptual point of view, this apparatus can be compared to a heat exchanger. Generally, the reforming reaction is carried out in a plurality of tubes (tube bundle) filled with catalyst and crossed by the flow of hydrocarbons and water vapour. The reaction heat is supplied through indirect heat exchange from a heating fluid licking the tubes on the mantel side.

As known, in the field of endothermic reactions and more specifically of hydrocarbon reforming reactions the need is more and more felt of providing processes that on the one hand imply the lowest energy consumption and on the other hand can be carried out in simple and reliable reforming equipment or plants with a high heat efficiency and that need low investment and maintenance costs.

PRIOR ART

In order to meet the above mentioned need, processes such as hydrocarbon reforming processes have been proposed in the field, wherein the reaction heat is supplied through indirect heat exchange with a heating fluid.

Processes of this type have been described for example in the following papers: "Synetix's advanced gas heated reformer, P. W. Farnell" and "New Kellogg Brown & Root ammonia process, Jim Gosnell"; both expounded at the "44th AIChE Annual meeting on safety in ammonia plants and related facilities", Seattle, USA, 27-30 Sep. 1999.

To date, such processes, that need equipment such as the above described exchanger type reformers, have found very limited practical application as they require an overall energy consumption equal to or even higher than the traditional kiln-type reformers. Moreover, they suffer from yet unsolved, new technological problems, such as the metal dusting.

In fact, although they guarantee a higher heat exchange efficiency between the reactant gases (hydrocarbons and water vapour) and the heating fluid, as well as a higher efficiency in the recovery of the residual heat of the heating fluid leaving the exchanger type reformer, this kind of processes has a number of disadvantages, some of which are reported hereinbelow.

For example, in case of a reforming reaction of hydrocarbons for obtaining the reactants for ammonia synthesis, the heat needed by the reforming reaction is generally provided in the exchanger type reformer (primary reformer) through indirect heat exchange with the hot gas exiting from the secondary reforming equipment.

In the secondary reforming apparatus, the reaction heat is provided through direct heat exchange of the heat produced by the exothermic combustion reaction of an oxidizing agent with part of the hydrocarbons and of the hydrogen which are in the apparatus.

However, as the oxidizing agent in such secondary reformer is generally air, and the amount of nitrogen introduced together with such oxidizing agent must be the stoichiometric one for the following $NH_3$ synthesis reaction, the amount of heat available for the exchanger type reformer is fixed and anyway not enough to allow a satisfying reforming of the hydrocarbons.

In order to obviate such situation, two possible solutions are normally proposed: 1) making the secondary reforming operate with an excess of oxidizing agent, i.e. air; 2) operating with air enriched in oxygen.

The first solution implies the drawback of having to compress an amount of air largely exceeding the stoichiometric amount (about 50% more). Moreover, the nitrogen in excess will not be used in the synthesis reaction, and therefore must be eliminated with expensive systems; in alternative, it may be let reach the ammonia synthesis loop, from which it has to be purged, and in this case it is noxious to the synthesis reaction. In both situations, the energy used for the compression of the nitrogen in excess is lost, increasing by consequence the energy consumption.

The second solution implies the burden of an air enrichment system, which is expensive and takes up a relevant amount of energy.

Both the solutions inevitably imply that the exchanger type reformer operates on the heating fluid side in a reducing atmosphere with a high concentration of CO. This causes the equipment to be subject to the so-called metal dusting phenomenon that will be described later on.

In order to reduce the risks connected to the problem of the metal dusting, an amount of process vapour greater than the nominal one is used during the reforming of hydrocarbons, with further consumption increases. Further on, sophisticated and expensive materials shall be used for the construction of the reforming equipment.

Should the reformed gas be used for other purposes, such as for hydrogen production in a process where no secondary reforming step is provided and the heating fluid is obtained by means of hydrocarbon combustion, the so obtained heating fluid shall flow in the exchanger type reforming unit with a pressure substantially equivalent to that of the reactant gases (for example about 25 bar in case of hydrogen).

To this end, it is necessary to compress the flow comprising oxygen (generally air) that acts as comburent in the combustion reaction of the hydrocarbons in order to obtain the heating fluid, at the pressure required, with ensuing relevant energy consumption.

It shall be noted that such compression is carried out in a compressor having a thermodynamic efficiency lower than 100%, typically around 70%.

Moreover, the energy consumption are further increased by the very high air flow rate to be compressed since it is necessary to run with a strong excess of air (about 100%) the combustion reaction for obtaining the heating fluid. In this way, the flame temperature inside the combustor is reduced down to acceptable values for the so obtained heating fluid not to damage the exchanger type reformer in which the reforming reaction takes place.

Furthermore, the expansion of the heating fluid in a turbine is required for the recovery of the energy of the heating fluid exiting from the exchanger type reformer. Such expansion takes place with a turbine thermodynamic efficiency lower than 100%, typically around 70%, thus implying further high energy consumption.

The overall efficiency of the compression and expansion cycle of the heating fluid is equal to the product of the compressor and turbine efficiency, that is 70% multiplied by 70% equals about 50%. This means that about half of the energy used to compress the heating fluid is lost.

Therefore, if the energy consumption required for the compression of the comburent and for the heating fluid expansion are added up, an overall energy consumption is obtained, which is greater than that (even if very high, itself) resulting in the traditional processes that employ kiln reformers.

In this respect, it is worth noting that the high energy consumption resulting from the reforming processes with indirect heat exchange with a heating fluid, does not relate so much to the reforming process in se, but to the compression and expansion steps needed for obtaining and making a heating fluid suitable for being employed in such process circulate.

As a result, because of these disadvantages, the reforming processes with indirect heat exchange with a heating fluid have found to date limited application, notwithstanding the fact that the apparatus intended to carry out such reforming process (the exchanger type reformer) has relevant advantages in terms of investment costs and allows to achieve a higher heat exchange and heat recovery efficiency with respect to the kiln reformers used in the conventional reforming processes.

SUMMARY OF THE INVENTION

The technical problem underlying the present invention is that of providing a process for obtaining a heating fluid to be used as heat source in hydrocarbon reforming reactions, that allows on one side to realise a reforming process which uses the exchanger type reformer as reforming apparatus, ameliorating its performance in terms of reliability and maintenance costs, and at the same time allows an overall energy consumption as low as possible and anyway lower than that of the conventional reforming processes which employ kiln reformers.

According to the present invention, the above problem is solved by a process of the above mentioned type, which is characterised in that it further comprises the step of feeding a flow comprising water, preferably in the form of vapour, to the fluid at high temperature and/or to the combustor.

Advantageously, thanks to the presence of water, preferably in the form of vapour, in the heating fluid fed to the reforming apparatus, it has been surprisingly possible to eliminate the risk of metal dusting in such equipment.

It is known to those skilled in the art that the above described exchanger type reformer apparatus, that serves for carrying out the reforming processes wherein the reaction heat is provided by means of indirect heat exchange with a heating fluid, is subject to the risk of metal dusting.

Such phenomenon is a destructive and fast corrosion of the parts of the equipment subjected to high temperatures, for example between 400 and 800° C., and to a reducing atmosphere comprising carbon monoxide.

The metal dusting is a phenomenon, which up to now has not been fully explained and is often unforeseeable. It comes from the so called "Boudouard" equilibrium, that is to say from the reaction between two molecules of carbon monoxide that produces a molecule of carbon dioxide and a molecular of free carbon. The free carbon, in the above mentioned conditions of high temperature and reducing atmosphere, variously combines with the metals, breaking down their crystalline structure and causing a localised metal dusting.

Because of the operating conditions to which the portion of the exchanger type reforming apparatus licked by the heating fluid is subjected, it will be particularly prone to the metal dusting phenomenon, particularly when the heating fluid has been obtained by combustion of hydrocarbons.

Thanks to the process according to the present invention, the heating fluid fed to the exchanger type reformer advantageously comprises a certain amount of water or water vapour. This makes the atmosphere of that portion of the exchanger type reforming apparatus licked by the heating fluid oxidant enough to prevent the metal dusting from taking place, to all advantage of a higher reliability of the reforming equipment and lower maintenance costs.

Furthermore, the absence of metal dusting, possible thanks to the process of the present invention, allows the investment costs needed for manufacturing the exchanger type reformers to be lowered, as for their construction less sophisticated and expensive materials than in the prior art may be employed.

Advantageously, the process according to the present invention allows also to drastically reduce the energy consumption of the compression and expansion steps required for obtaining the heating fluid and its circulation in the reforming plant, accordingly reducing in an easy and extremely effective way the overall energy consumption.

In particular, by feeding the flow comprising water, preferably in the form of water vapour, to the combustor, it has been surprisingly found that it can be advantageously achieved a lowering of the flame temperature that develops during the combustion of the hydrocarbons for obtaining the heating fluid. This allows a remarkable reduction of the amount of the flow comprising oxygen to be used in the combustion process as it is no more necessary to let the combustion take place in excess of comburent to lower the flame temperature.

As a result, the flow rate of the flow containing oxygen fed to then combustor, which has to be compressed at the operating pressure of the reforming apparatus, is by far lower than it is in the prior art, with ensuing high savings in terms of energy consumption.

Particularly advantageous results in terms of energy consumption have been obtained by feeding a flow of water vapour obtained through evaporation of a water flow at a predetermined pressure to the high temperature fluid and/or to the combustor.

According to a preferred embodiment of the present invention, the flow comprising water is fed into the combustor as vapour together with the flow comprising oxygen.

In this respect, the present process advantageously provides the steps of:

feeding at a predetermined pressure the flow comprising water into the flow comprising oxygen upstream the combustor;

heating the so-obtained flow in such a way to let the water at least partially evaporate and obtain a flow comprising oxygen and water vapour to be fed to said combustor.

Alternatively, the process according to the invention provides the steps of:

heating the flow comprising water;

feeding at a predetermined pressure the suitably heated flow comprising water into the flow comprising oxygen upstream of the combustor, in such a way to let the water at least partially evaporate and obtain a flow comprising oxygen and water vapour.

In doing this, liquid water may be pumped with extremely low energy consumption into the gas flow comprising oxygen. Only afterwards the water will be evaporated at relatively low temperatures, preferably around 300° C., exploiting heat sources already available in the process.

It shall be noted that, according to a preferred aspect of the present invention, the process for obtaining the heating fluid provides the compression only of the flow gas comprising hydrocarbons and of the gas flow comprising air, preventing in this way the compression of the water vapour.

In other words, thanks to the present invention, the flow comprising water in the form of vapour fed to the combustor or directly to the high temperature heating fluid leaving the combustor, does not require relevant energy consumption since it is advantageously produced by evaporating water at a predetermined pressure, i.e. previously pumped water flowing at a pressure substantially corresponding to the process pressure.

Furthermore, during the expansion step of the heating fluid that follows the indirect heat exchange step, there are obtained relevant energy savings and a higher thermodynamic cycle efficiency than with the process of the prior art.

In fact, the water vapour present in the heating fluid, which has been obtained with low energy consumption, is expanded together with the rest of the burnt gases, thus participating in remarkably increasing the flow rate of such fluid with a particularly advantageous energy recovery.

According to the above mentioned preferred embodiment of the invention and thanks to the presence of water vapour in the flow comprising oxygen to be used as comburent in the combustion of the hydrocarbons, a clear increase of the thermodynamic cycle efficiency is advantageously observed in the various compression and expansion steps for obtaining a heating fluid and for the circulation thereof. This advantageously reflects in a drastic decrease of energy consumption.

As an example, it has been found that for a same amount of gaseous reactants to be produced for ammonia synthesis, the process according to the present invention allows achieving a saving up to 20% in the consumption of hydrocarbons (methane) to be burnt for obtaining the heating fluid, with respect to the above described processes according to the prior art. As a result, the smaller amount of hydrocarbons to be burnt and hence to be compressed allows carrying out the compression of the gas flow comprising oxygen with a power up to 65% less than the compression power required by the prior art, with ensuing relevant savings in terms of energy consumption and investment costs.

Although the reforming processes based on the indirect heat exchange with a heating fluid and the respective technology for exchanger type reformer have been known for several decades, and although the ever impelling need in the field of providing processes able to achieve conspicuous energy savings with respect to the reforming of hydrocarbons, only after the researches carried out by the Applicant—in clear contrast with even the most recent teachings of the prior art in this field—it has been possible to develop a process with the above mentioned advantages. That is to say, a process able to provide, with particularly reduced energy consumption, a heating fluid suitable for being used as indirect heat source for the reforming of hydrocarbons and that allows to protect the reforming apparatus from the risk of metal dusting, overcoming in an easy and effective way the drawbacks mentioned above with respect to the prior art.

The features and the advantages of the present invention will become clear from the following indicative and non-limiting description of an embodiment of the invention, made with reference to the attached drawings.

DETAILED DESCRIPTION OF A PREFERRED EMBODIMENT

Figure 1:
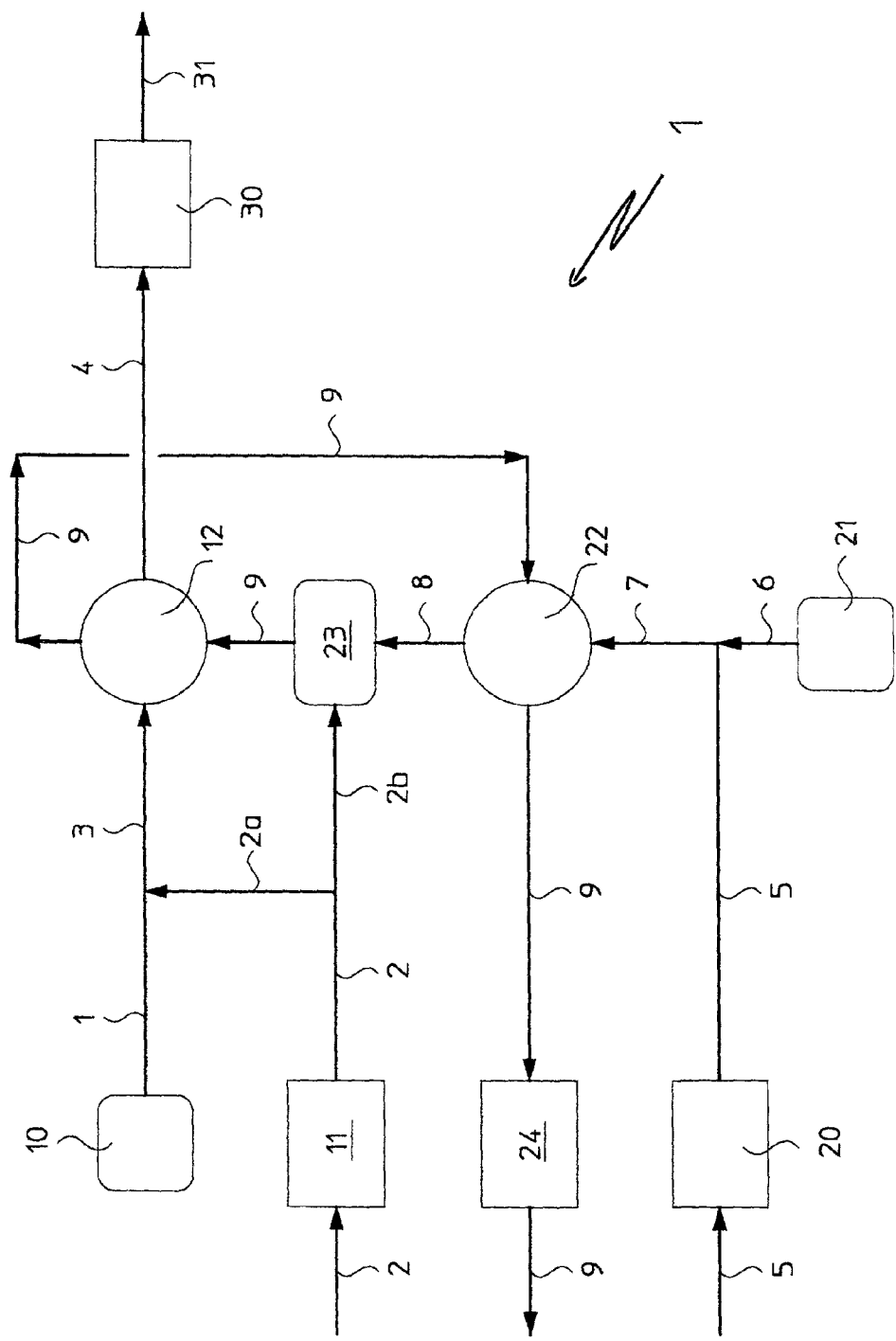
FIG. 1 shows in a general and schematic way a block diagram of a process for the reforming of hydrocarbons by indirect heat exchange with a heating fluid, wherein there is outlined the process for obtaining such heating fluid according to a preferred embodiment of the present invention.

With reference to FIG. 1, a block diagram of a process for hydrocarbon reforming is generally indicated with 1; in such process the reaction heat is provided through indirect heat exchange with a heating fluid.

In particular, a process of this type comprises both the actual hydrocarbon reforming process, which relates to the conversion of hydrocarbons in basic chemical compounds, such as hydrogen, carbon monoxide and carbon dioxide, and the process for obtaining the heating fluid that will provide the reaction heat during the hydrocarbon reforming.

These two processes are interlaced with one another, and therefore have been depicted jointly; together they build the reforming process generally indicated with 1.

In FIG. 1, only the main process steps have been shown, unessential details for carrying out the present invention and/or those already known to a man skilled in the art having been cut out.

The process steps specifically relating to the reforming of hydrocarbon have been indicated in FIG. 1 by the blocks 10, 11 and 12 and by the flow lines 1, 2, 2a, 3 and 4.

In particular, blocks 10-12 indicate a process water vapour source (block 10), a compression step of a flow comprising hydrocarbons (block 11) and a reforming step of hydrocarbons (block 12), respectively.

In turn, the flow lines indicate a gas flow comprising water vapour (flow line 1), a flow comprising hydrocarbons (flow lines 2, 2a), a flow comprising hydrocarbons and water vapour (flow line 3) and a gas flow comprising hydrogen (flow line 4), respectively.

With process water vapour source (block 10), it is meant any water vapour feed under pressure provided in the reforming process. Such water vapour generally has a pressure comprised between 2 and 100 bar and a temperature comprised between 120 and 600° C. Of course it is possible to use water vapour coming from an external source with respect to the reforming process.

In the example of FIG. 1, a flow comprising light gaseous hydrocarbons (preferably C1-C4) such as methane or natural gas is used as gas flow comprising hydrocarbons (flow line 2).

Before being mixed with a flow comprising water vapour (flow line 1) and fed to the reforming step (block 12, flow line 3), the flow comprising hydrocarbons is suitably compressed in a compression step represented by block 11.

In this respect, the block 11 comprises a compressor for the compression of such flow at a pressure preferably comprised between 2 and 100 bar.

According to the purity and to the temperature of the flow comprising hydrocarbons, there may be provided further heating and desulfurization steps thereof (not shown as in se conventional).

Once fed to the block 12, the gas flow comprising hydrocarbons and water vapour (flow line 3) undergoes the reforming step, in which as a result of the various reforming and shift reactions the hydrocarbons are decomposed in basic compounds such as hydrogen, carbon monoxide and carbon dioxide.

Before being fed to the block 12 for the reforming reaction the gas flow comprising hydrocarbons and water vapour may be preheated up to the reaction temperature in a preliminary heating step, which is not shown in FIG. 1 because it is conventional.

In order to carry out the reforming step of hydrocarbons, block 12 comprises an exchanger type reforming apparatus (or exchanger reformer) of the type shown in FIG. 2, which is per se known and hence will not be described in details in the following description. Reference is for instance made to EP-A-0 841 301.

Such equipment comprises inside it a reaction space filled with catalyst, generally a tube bundle, crossed by the gas flow comprising hydrocarbons and water vapour.

As output from the reforming step (block 12), a flow comprising, beside hydrogen, inter alias, carbon monoxide and/or carbon dioxide, is obtained. Such flow is indicated by flow line 4. According to its composition, it will be possible to use such flow 4 as basic reactant in subsequent chemical reactions.

The gas flow comprising hydrogen coming from the block 12 (flow line 4), is in some instances suitably cooled, by means of one or more coolant streams, so as to effectively recover the heat carried by such flow and to allow the condensation of the water vapour therein contained.

The water that condenses during this cooling step may be advantageously used as condensate or process water in the process for obtaining the heating fluid according to the present invention, as will be described herein below.

The process steps for obtaining the heating fluid according to the present invention are indicated by the blocks 11, 20-24 and by the flow lines 2, 2b, 5-9.

In particular, blocks 20-24 indicate a compression step of a gas flow comprising oxygen (block 20), a water source (block 21), a heating step of a flow comprising oxygen and water (block 22), a mixing and combustion step of a gas flow comprising hydrocarbons with a flow comprising oxygen and water vapour (block 23) and an expansion step of a heating fluid (block 24), respectively.

Block 11 corresponding to the compression step of the gas flow comprising hydrocarbons has already been described above with reference to the actual reforming process.

In turn, the flow lines indicate a gas flow comprising hydrocarbons (flow lines 2 and 2b), a gas flow comprising oxygen (flow line 5), a flow comprising water (flow line 6), a flow comprising oxygen and water (flow line 7), a gas flow comprising oxygen and water vapour (flow line 8) and a heating fluid (flow line 9), respectively.

The gas flow comprising hydrocarbons fed to the combustion step (block 23) through the flow lines 2 and 2b, is the same as the one (flow lines 2 and 2a) above described fed to the reforming step (block 12).

In fact, as shown in FIG. 1, a portion (flow line 2a) of the flow 2 coming from the compression step (block 11) is mixed with a flow comprising water vapour (flow line 1) and fed to the block 12 (flow line 3). Whereas the remaining portion of such flow of hydrocarbons (flow line 2b) is used as fuel in the block 23.

Generally, the portion of gas flow comprising hydrocarbons fed to the reforming step (flow line 2a) is twice the portion of such flow fed to the combustion step (flow line 2b).

Therefore, with respect to composition, pressure and temperature of the hydrocarbon flow 2b fed to the block 23, reference is made to the above description relating to the flow lines 2 and 2a and to the block 11.

Of course, it is clear that, according to the specific need, it is also possible to use two separate hydrocarbon gas flows with different composition, temperature and pressure. In this case (not shown in FIG. 1) two separate compression steps may be required.

In the example of FIG. 1, air has been used as gas flow comprising oxygen (flow line 5).

The air flow line 5, which is the comburent in the combustion reaction (block 23), is previously compressed in a compression step (block 20) to take it to the pressure required for the combustion of the hydrocarbon gas flow.

In this respect, block 20 comprises a compressor for the compression of such flow at a pressure preferably comprised between 2 and 100 bar.

Generally the flow comprising oxygen (flow line 5) and the flow comprising hydrocarbons are compressed so as to obtain a heating fluid having a pressure substantially equivalent to the pressure of the reactants fed to the reforming equipment (block 12).

According to a preferred embodiment of the process according to the present invention (shown in FIG. 1), the flow comprising water (flow line 6) coming from the water source indicated with the block 21 is advantageously joined to the gas flow comprising air coming from the compression step (block 20).

The water source may be an external source with respect to the process or, preferably, recovery water coming from other process units, such as the process condensate obtained by cooling the flow comprising hydrogen leaving the reforming step (block 12).

Anyway, the water flow coming from the block 21 is advantageously fed at a predetermined pressure to the air flow 5. More precisely, the water is pumped in the air flow 5 at a pressure substantially equivalent to the pressure of the air itself coming from the block 20.

The flow comprising air and water (flow line 7) obtained by joining the flow lines 5 and 6, is advantageously directed to a heating step (block 22) for evaporating at least partially the water contained in such flow and obtaining a gas flow comprising air and water vapour (flow line 8).

In this respect, particularly satisfying results have been obtained by evaporating completely the water contained in the flow 7 at relatively low temperature, for example comprised between 100 and 300.

The block 22, where the heating step takes place, may comprise one or more conventional heat exchangers, which are not shown. Preferably the heating step is carried out in a plurality of heat exchangers arranged in series, so as to increase the heat exchange efficiency.

Water evaporation may anyway take place in a following process step, such as in the combustor during the mixing of the comburent with the hydrocarbons or even during the combustion of the hydrocarbons.

One or more heat exchangers may be provided for the heating step of the flow 7. The heating fluid leaving the reforming step (flow line 9), may be advantageously used as heating fluid of the flow comprising air and water, as will be described in the following, in a more detailed manner.

The gas flow comprising air and water vapour (flow line 8) is then mixed with the flow comprising hydrocarbons (flow line 2b) inside the block 23, wherein the combustion step of the hydrocarbons takes place, thus obtaining a high temperature heating fluid (flow line 9).

According to a not shown alternative embodiment of the present process, the hydrocarbon flow and the flow comprising oxygen may be jointly fed in to the combustor, thus mixing them outside of the latter.

Furthermore, still according to not shown alternative embodiments of the present invention, the flow comprising water, preferably in the form of vapour, may be fed from the block 21 to the flow comprising hydrocarbons (flow line 2b), or directly to the combustor (block 23), or even downstream of it, in the high temperature fluid of burnt gases (flow line 9).

The block 23, where the combustion step takes place, generally comprises a combustor inside which one or more burners for the combustion of the hydrocarbons/air mixture are arranged.

The heating fluid (flow line 9) from the block 23 is hence employed in the reforming step (block 12), as indirect heat source for the reforming of hydrocarbons.

The temperature of the heating fluid obtained in the block 23 is generally comprised between 1.400 and 1.800° C., preferably around 1.500° C.

The heating fluid is made up of a substantially gaseous flow comprising, inter alias, carbon dioxide, nitrogen and oxygen.

Advantageously thanks to the process according to the present invention, the heating fluid further comprises water, preferably in the form of vapour. The presence of water in the heating fluid supplied to the reforming step (flow line 9 and block 12) renders the reforming apparatus sufficiently oxidant thus excluding the risk of metal dusting. Risk to which the exchanger type reformers intended for carrying out the hydrocarbon reforming process are normally liable.

Such advantages combine with all the previously described advantages due to an improvement of the thermodynamic cycle of the compression and expansion steps of the heating fluid as well as to a reduction of energy consumption.

Particularly satisfying results have been obtained by feeding water, preferably in the form of vapour, to the combustor (block 23) and/or to the high temperature fluid leaving the combustor (flow line 9) in an amount comprised between 0.1 and 0.7 times the flow comprising oxygen.

At the output of block 12, the heating fluid (flow line 9) has a temperature lower than the inlet temperature to the block 12, having exchanged heat for the reforming reaction of hydrocarbons.

Such temperature is anyway high enough (500-800° C.) to enable, according to a preferred embodiment of the present invention, the heating—by indirect heating exchange—and the following evaporation of the water contained in the flow 7 fed to the heating step indicated by the block 22 of FIG. 1.

At the output of block 22, the heating fluid (flow line 9) further cooled is finally expanded in an expansion step (block 24) thus accomplishing an advantageous recovery of the compression energy.

The block 24 generally comprises at least one turbine for allowing the desired expansion of the heating fluid.

Thanks to the presence of water vapour in the heating fluid, the gas flow rate to be expanded in the turbine is remarkably higher than in the prior art, making thus an improvement of the thermodynamic cycle efficiency and therefore a further reduction of the energy consumption possible.

This advantage has been found as particularly important when the water vapour is not previously compressed, but obtained through evaporation of a water stream at a predetermined pressure as in the example of FIG. 1.

Once cooled and expanded, the heating fluid (flow line 9) is then vented or condensed in order to recover the water therein contained.

In this respect, it is worth noting that should the heating fluid be vented, it will have a particularly low content of pollutants, such as nitrogen oxide, as the presence of water in the combustor advantageously reduces the formation of such compounds.

Finally, once suitably purified, the gas flow comprising, inter alias, hydrogen and carbon monoxide (flow line 4) obtained in the reforming step may be used as basic compound for the chemical synthesis of products such as ammonia, methanol. Or it can be appropriately purified to pure hydrogen and/or carbon monoxide or for any common application.

Should the produced gas be used for ammonia synthesis, it shall be noted that such gas may be sent to the subsequent secondary reforming step without further treatment. Moreover, it shall be noted that it is not necessary to carry out such secondary reforming in presence of stoichiometric excesses of air or using air enriched in oxygen, thus avoiding the ensuing problems in terms of costs and energy consumption.

In this respect, in FIG. 1, the block 30 schematically indicates the necessary step or steps for the synthesis of the desired product, which comes out from the block 30 through the flow line 31.

As these steps are conventional and known to the man skilled in the art, they will not be described in detail in the following description.

According to an alternative embodiment of the combustion process according to the present invention, the gas flow comprising air (comburent, flow line 5) is enriched with water vapour through adiabatic saturation.

In this case, the combustion process comprises the step of heating the flow comprising water and feeding it at a predetermined pressure into the flow comprising oxygen (flow line 5) upstream of the combustor, in such a way to let the water at least partially evaporate and obtain a flow comprising oxygen and water vapour.

In order to increase to the maximum the amount of evaporated water in the flow comprising oxygen, it is preferable to suitably heat such flow as well.

For carrying out the present process, the way the gas flow comprising air is enriched with water vapour is not particularly critical, as methods might be employed different from what herein described.

In this respect, the embodiment of the process exemplified in FIG. 1 shall be considered purely a preferred and not limiting embodiment of the present invention.

Figure 2:
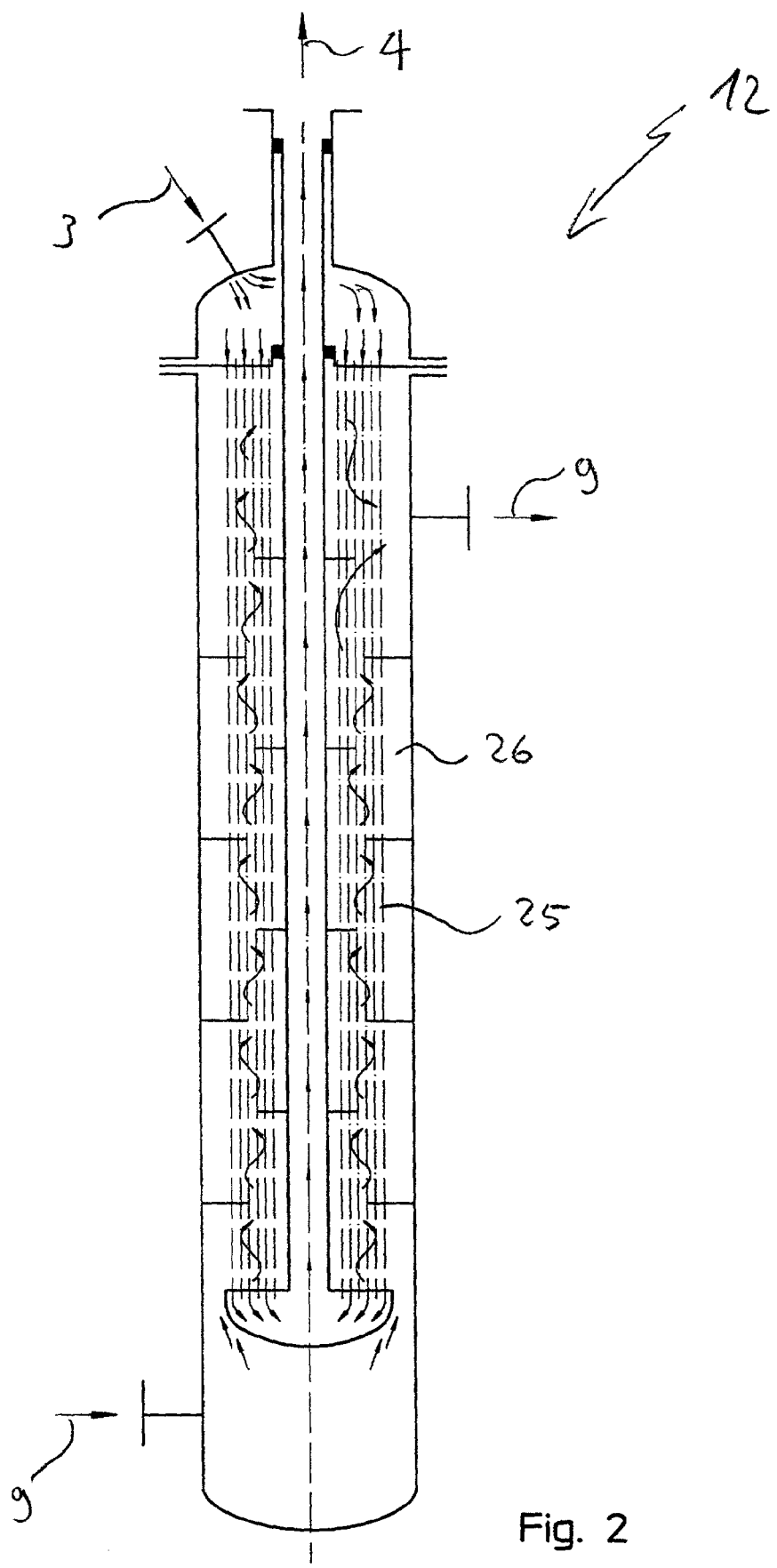
FIG. 2 shows a schematic longitudinal cross section view of an exchanger type reforming apparatus.

According to a further aspect of the present invention, there is also advantageously provided a hydrocarbon reforming process in an exchanger type reformer as for instance shown in FIG. 2, which corresponds to block 12 of FIG. 1.

The hydrocarbon reforming process comprises the steps of:

feeding a gas flow comprising hydrocarbons and water vapour (flow line 3) in a reaction space 25 comprising catalyst within the exchanger type reformer 12;

feeding a heating fluid (flow line 9) in a space 26 adjacent to the reaction space in the exchanger type reformer 12;

reacting in a catalytic way the gas flow comprising hydrocarbons by indirect heat exchange with the heating fluid, thus obtaining a gas flow comprising hydrogen (flow line 4), and is characterised in that the heating fluid (flow line 9) comprises water, preferably in the form of vapour.

As far as the several advantages due to the presence of water vapour in the heating fluid are concerned, reference is made to the previous description.

Advantageously, the heating fluid is obtained by means of the above-described process, preferably according to the process described with reference to the example of FIG. 1.

According to a particularly preferred and advantageous aspect of the hydrocarbon reforming process just described, there is provided the further step of cooling down the heating fluid leaving the exchanger type reformer (flow line 9) by indirect heat exchange with a flow comprising oxygen and/or water (flow line 7) fed to the combustor (block 23).

In this case, the step of cooling down the heating fluid corresponds to the step of heating the flow comprising air and water shown in FIG. 1 and indicated by the block 22.

According to a further aspect thereof, the present invention further concerns the use of water, preferably in the form of vapour, in a process for obtaining a heating fluid as indirect heat source for carrying out endothermic reactions, such as the reforming of hydrocarbons. Reference shall be made to the description above as far as the advantages of such use are concerned.

The numerous advantages achieved by the present invention are well clear from the above description; in particular, it is possible to provide a process for obtaining a heating fluid to be used as particularly effective and energy-saving heat source in hydrocarbon reforming reactions, which is extremely easy and reliable to be carried out and does not require high investment and maintenance costs.

The invention claimed is:

1. A process for obtaining a heating fluid to be used as an indirect heat source for carrying out reforming reactions, wherein said heating fluid does not comprise products resulting from said reforming reactions, comprising the steps of:

feeding a flow comprising hydrocarbons and a gas flow comprising oxygen to a combustor, wherein such flows are suitably compressed;

burning said hydrocarbons in presence of said oxygen in said combustor, thus obtaining a high temperature fluid comprising carbon dioxide and oxygen; and feeding a flow comprising water to said high temperature fluid and/or to said combustor.

2. The process according to claim 1, further comprising feeding said water in an amount comprised between 0.1 and 0.7 times said flow comprising oxygen.

3. The process according to claim 1, wherein said flow comprising water is fed to said high temperature fluid and/or to said combustor as vapour obtained through evaporation of a water flow.

4. The process according to claim 1, wherein said flow comprising water is fed into said combustor in the form of vapour together with said flow comprising oxygen.

5. The process according to claim 4, further comprising the steps of:

feeding said flow comprising water into said flow comprising oxygen upstream of said combustor;

heating the so-obtained flow of water and oxygen in such a way to let said water at least partially evaporate and obtain a flow comprising oxygen and water vapour.

6. The process according to claim 4, further comprising the steps of:

heating said flow comprising water to obtain a suitably heated flow comprising water;

feeding said suitably heated flow comprising water into said flow comprising oxygen upstream of the combustor, in such a way to let said water at least partially evaporate and obtain a flow comprising oxygen and water vapour.

7. A process for carrying out hydrocarbon reforming reactions in an exchanger type reformer, comprising the steps of:

feeding a gas flow comprising hydrocarbons and water vapour in a reaction space (25) comprising catalyst in said exchanger type reformer;

feeding a heating fluid in a space (26) adjacent to said reaction space (25) in said exchanger type reformer;

reacting in a catalytic way said gas flow comprising hydrocarbons by indirect heat exchange with said heating fluid, thus obtaining a gas flow comprising hydrogen;

wherein said heating fluid does not comprise said as flow comprising hydrogen and said heating fluid is obtained through the process for obtaining a heating fluid according to claim 1.

8. The process according to claim 7, further comprising a step of cooling down said heating fluid leaving the exchanger type reformer by indirect heat exchange with a flow comprising oxygen and/or water fed to said combustor.

* * * * *